United States Patent
Gao et al.

(10) Patent No.: US 11,460,534 B2
(45) Date of Patent: Oct. 4, 2022

(54) IDENTIFYING CLIENT DEVICE LOCATIONS THROUGH GROUP-BASED ACCESS POINT VOTING

(71) Applicant: Cisco Technology, Inc., San Jose, CA (US)

(72) Inventors: Zhigang Gao, Twinsburg, OH (US); Matthew A. Silverman, Shaker Heighls, OH (US); Paul J. Stager, Akron, OH (US); Huaiyi Wang, North Royalton, OH (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 16/748,704

(22) Filed: Jan. 21, 2020

(65) Prior Publication Data
US 2021/0223352 A1    Jul. 22, 2021

(51) Int. Cl.
  *G01S 3/02*    (2006.01)
  *G01S 5/02*    (2010.01)
  *G01S 5/04*    (2006.01)
  *H04W 84/12*   (2009.01)

(52) U.S. Cl.
  CPC ............. *G01S 5/0273* (2013.01); *G01S 5/04* (2013.01); *G01S 5/0221* (2013.01); *G01S 5/0289* (2013.01); *G01S 5/0295* (2020.05); *H04W 84/12* (2013.01)

(58) Field of Classification Search
  CPC ........ G01S 5/0273; G01S 5/0221; G01S 5/04; G01S 5/0289; G01S 5/0295
  USPC ...................................................... 342/451
  See application file for complete search history.

(56) References Cited

U.S. PATENT DOCUMENTS

| 9,521,520 B2 * | 12/2016 | Silverman ............. G01S 5/0036 |
| 9,551,775 B2 | 1/2017 | Rangarajan et al. |
| 9,699,607 B2 * | 7/2017 | Markhovsky ............. G01S 5/14 |
| 9,804,256 B2 * | 10/2017 | Jamieson .................. G01S 5/04 |
| 9,823,330 B2 * | 11/2017 | Hart ......................... G01S 3/38 |

(Continued)

FOREIGN PATENT DOCUMENTS

WO     2014060777 A2    4/2014

OTHER PUBLICATIONS

Cisco DNA Center User Guide, Release 1.3.3.0 First Published: Jan. 17, 2020.

(Continued)

*Primary Examiner* — Chuong P Nguyen
(74) *Attorney, Agent, or Firm* — Patterson + Sheridan, LLP

(57) ABSTRACT

Embodiments herein describe performing AoA resolving to identify a plurality of AoAs corresponding to a multipath signal and then using AP voting to identify a location of the client device. AoA resolving enables an AP to identify the different angles at which a multipath signal reaches the AP. That is, due to reflections, a wireless signal transmitted by a single client device may reach the AP using multiple paths that each has their own AoA. The AP can perform AoA resolving to identify the AoAs for the different paths in a multipath signal. In one embodiment, the AoAs for two APs (or a subset of the APs) can be used to identify cross points or intersection points that represent candidate locations of the client device. A voting module can determine whether those cross points corresponds to AoAs identified by the remaining APs.

20 Claims, 7 Drawing Sheets

(56) References Cited

U.S. PATENT DOCUMENTS

| | | | |
|---|---|---|---|
| 9,864,042 B2 * | 1/2018 | Pandey | G01S 5/0252 |
| 10,091,616 B2 * | 10/2018 | Prevatt | G01S 5/14 |
| 10,433,111 B2 * | 10/2019 | Prevatt | H01Q 1/241 |
| 10,433,274 B2 * | 10/2019 | Jamieson | G01S 3/48 |
| 10,677,885 B2 * | 6/2020 | Silverman | H04B 7/0871 |
| 10,761,177 B2 * | 9/2020 | Hart | G01S 3/38 |
| 2015/0234033 A1 * | 8/2015 | Jamieson | G01S 5/04 |
| | | | 455/456.1 |
| 2016/0334498 A1 * | 11/2016 | Jamieson | G01S 3/48 |
| 2019/0242970 A1 | 8/2019 | Silverman et al. | |
| 2021/0349171 A1 | 11/2021 | Gao et al. | |

OTHER PUBLICATIONS

Li et al., "Secure Indoor Positioning Against Signal Strength Attacks Via Optimized Multi-voting," IWQoS '19, dated Jun. 24-25, 2019, pp. 1-10.

* cited by examiner

IDENTIFYING CLIENT DEVICE LOCATIONS THROUGH GROUP-BASED ACCESS POINT VOTING

TECHNICAL FIELD

Embodiments presented in this disclosure generally relate to identifying a location of a client device using access point (AP) voting.

BACKGROUND

Current location techniques measure concurrent Angle-of-Arrival (AoA) using gridded AoA heat maps to achieve room-level (1-5 meters) or even sub-meter location accuracy. However, location techniques where a maximum likelihood (ML) solution is approximated over gridded AoA heat maps suffer from efficiency problems in terms of computation, storage, and message passing. Specifically, generating AoA heat maps is a computationally intensive task, even when their computation region is bounded by a received signal strength indicator (RSSI) model.

For a given a client device, a location technique generates a heat map for each AP through correlating the measured AoA phase vector with the ideal AoA phase vectors for the grid points within the interested region. The total number of computations needed to locate the client device is proportional to the number of antennas for each AP, the number of APs involved in the location, the heat map grid size, and the size of the interested region. The number of complex multiplications and adds that need to be performed can balloon quickly, which can use a significant portion of the system resources in the APs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
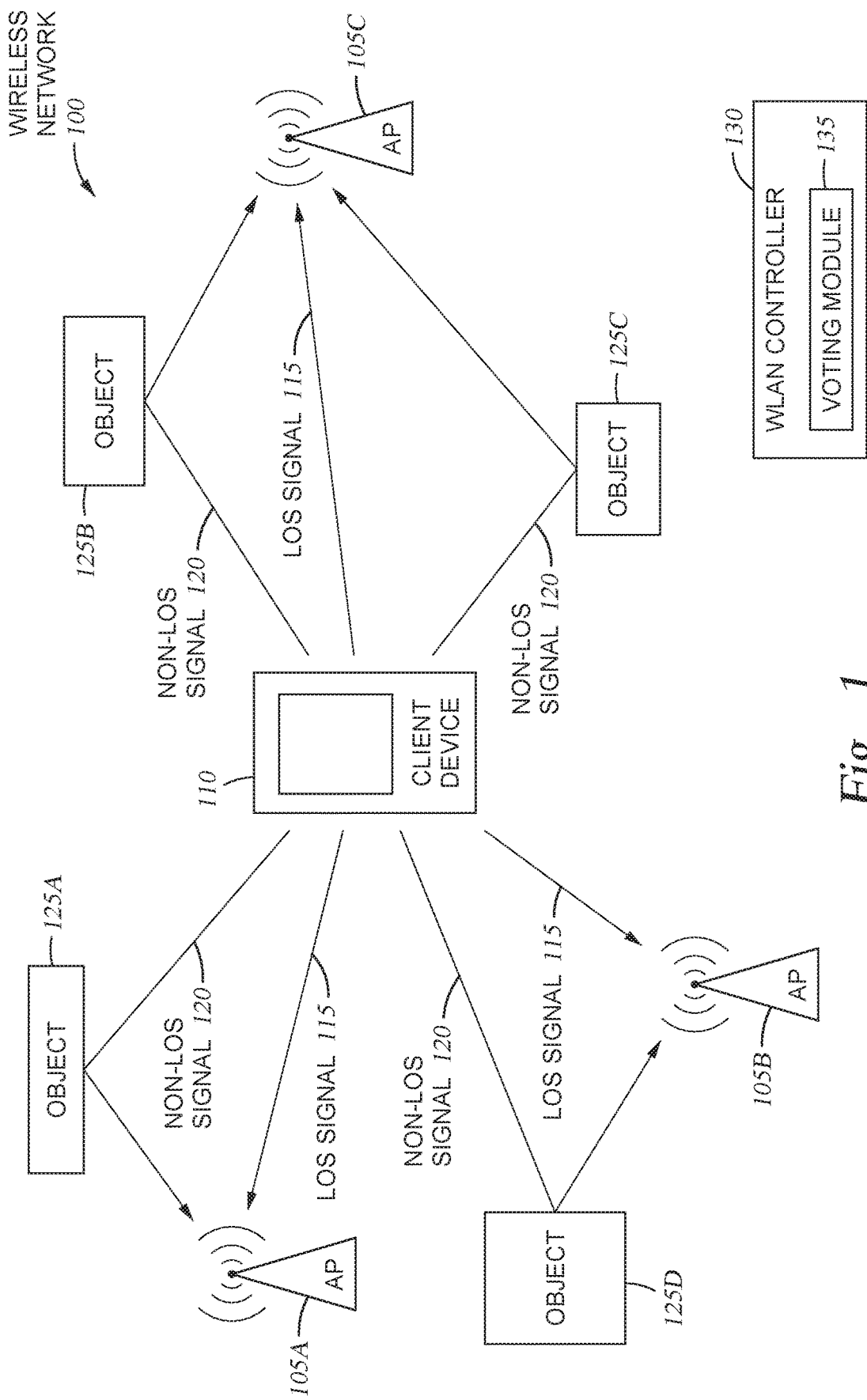
FIG. 1 illustrates a wireless network that performs AP voting to identify a location of a client device, according to one embodiment.

One embodiment presented in this disclosure is a method that includes performing angle of arrival (AoA) resolving at a plurality of access points (APs), wherein each of the plurality of APs generate multiple AoA values where the multiple AoA values represent directions of a multipath signal generated by a client device, identifying cross points using the multiple AoA values from the plurality of APs, wherein each cross point identifies a candidate location of the client device, and determining scores for each of the cross points based on how many of the plurality of APs have AoA values corresponding to the cross points.

Another embodiment described herein is a computing system that includes a processor and a memory storing a program executable by the processor to perform an operation. The operation includes receiving multiple AoA values from a plurality of APs, wherein the multiple AoA values represent directions of a multipath signal generated by a client device, identifying cross points using the multiple AoA values from the plurality of APs where each cross point identifies a candidate location of the client device, and determining scores for each of the cross points based on how many of the plurality of APs have AoA values corresponding to the cross points.

Example Embodiments

Embodiments herein describe performing AoA resolving to identify a plurality of AoAs corresponding to a multipath signal and then using AP voting to identify a location of the client device. AoA resolving enables an AP to identify the different angles at which a multipath signal reaches the AP. That is, due to reflections, a wireless signal transmitted by a single client device may reach the AP using multiple paths that each has their own AoA. The AP can perform AoA resolving to identify the AoAs for the different paths in a multipath signal.

However, identifying the AoAs of the multipath signal is not sufficient to identify a direction of the client device since the AP does not know which path is the line-of-site (LOS) path (i.e., the direct path to the client device) and which path (or paths) is a non-LOS path. The embodiments herein use AP voting to identify the LOS path for the various APs which can be triangulated to identify the location of the client device. In one embodiment, the AoAs for two APs (or a subset of the APs) can be used to identify cross points or intersection points that represent candidate locations of the client device. A voting module can determine whether those cross points correspond to AoAs identified by the remaining APs. If so, this indicates that a cross point is more likely to be the true location of the client device rather than a ghost target corresponding to a non-LOS path. A cross point with the most votes (i.e., the highest score) can then be identified as the location of client device.

In one embodiment, for improved accuracy (and if there is a tie), the voting module can generate heat maps limited to the locations of the cross points with the highest scores, or use a search function to identify the cross point most likely to be the location of the client device. In either case, these calculations are confined to a small geographic region unlike the techniques discussed above, thereby limiting the number of computations that are performed.

FIG. 1 illustrates a wireless network 100 that performs AP voting to identify a location of a client device 110, according to one embodiment. The wireless network 100 illustrates the multipath problem that results in angular ambiguity when performing AoA resolving. As shown, the wireless network 100 includes three APs 105A-C that receive wireless signals from a client device 110 (e.g., a mobile phone, laptop, tablet, or any other computing system coupled to a Wi-Fi network).

In one embodiment, the client device 110 can transmit a wireless signal (e.g., one or more packets) that results in the various LOS signals 115 and non-LOS signals 120 that form a multipath signal. That is, the multipath signal includes three LOS signals 115 (or paths) where the wireless signal reaches the APs 105 without reflecting off objects 125. The multipath signal also includes four non-LOS signals 120 where the wireless signal reaches the APs 105 after reflecting off the objects 125. The non-LOS signals 120 are common in many indoor and outdoor environments where objects 125 can reflect radio frequency (RF) signals used in Wi-Fi networks. In this example, each AP 105 receives at least one LOS signal 115 and at least one non-LOS signal 120. The number of non-LOS signals 120 received by an AP 105 may depend on the type and density of the objects 125 in the physical environment. The embodiments herein can be used regardless of the number of non-LOS signals 120 received at an AP 105, and can be used when the strength of the non-LOS signal 120 (or signals) is greater than the strength of the LOS signal 115.

As discussed in detail below, AoA resolving can be used to identify the AoAs of the LOS and non-LOS signals 115, 120 illustrated in FIG. 1. That is, each AP (or a wireless local access network (WLAN) controller 130) can perform AoA resolving to identify the AoAs of the portion of the multipath signal it receives. For example, the AP 105A can determine two AoA values: one angle value of the non-LOS signal 120 reflecting off the object 125A and the LOS signal 115 received directly from the client device 110. However, although the APs can identify the AoAs of the different paths, the APs (or WLAN controller 130) do not know which AoA corresponds to a LOS path or to a non-LOS path. Without this information, the APs cannot perform triangulation (i.e., use the AoAs to identify an intersection point) to identify a location of the client device 110. That is, to obtain an accurate location of the client device 110, each AP 105 should use the AoAs corresponding to the LOS signals 115 to perform triangulation. If the AoAs for any one of the non-LOS signals is used instead, triangulation results in a completely different location of the client device 110.

Relying on the RSSI of the signals 115, 120 is often not accurate enough to identify whether an AoA corresponds to a LOS path or a non-LOS path. The non-LOS signals 120 (or a combination of non-LOS signals) can have a greater RSSI than the LOS signal 115. As such, the embodiments herein describe performing AP voting to identify the AoA for each AP 105 corresponding to the LOS path to the client device 110. These AoAs can then be used to accurately identify the location of the client device 110 (e.g., with sub-meter accuracy). As shown, the WLAN controller 130 includes a voting module 135 that receives the AoAs from the APs 105 and performs AP voting by identifying cross points where paths derived from the AoAs intersect. As discussed in more detail below, the scores of the cross points are increased as more AoAs intersect with the cross points which helps to identify the cross point most likely corresponding to the actual location of the client device 110.

Although the voting module 135 is shown on the WLAN controller 130, in another embodiment, the voting module 135 may execute on one of the APs 105 (e.g., a master AP). In that case, the other APs 105 send the AoAs identified when performing AoA resolving to the master AP so that AP can perform AP voting.

Figure 2:
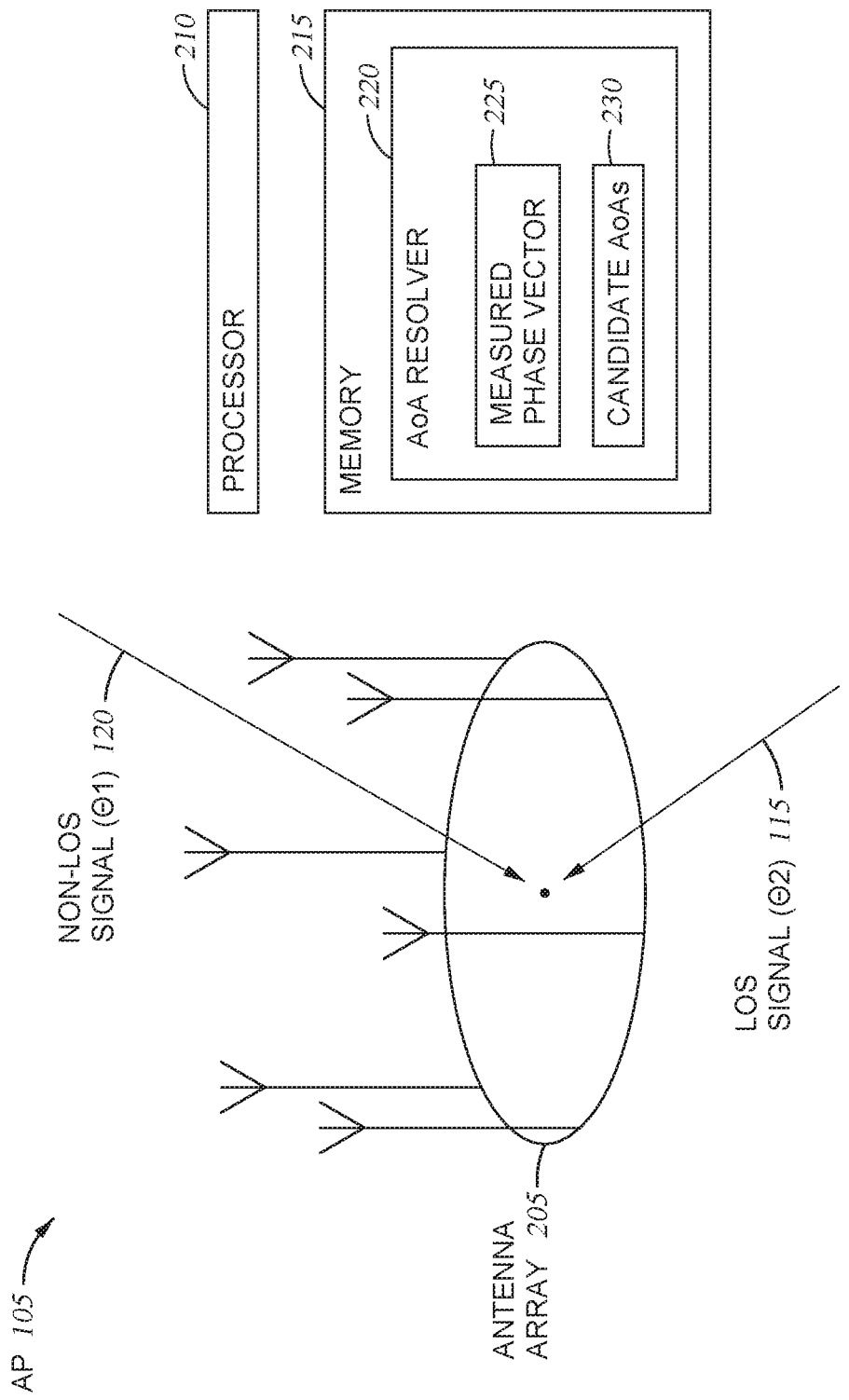
FIG. 2 illustrates various components in an AP, according to one embodiment.

FIG. 2 illustrates various components in an AP 105, according to one embodiment. That is, FIG. 2 illustrates various hardware and software components that can be in the APs 105 illustrated in FIG. 1. As shown, the AP 105 includes an antenna array 205 with multiple antennas. In this example, the antenna array 205 receives a LOS signal 115 and at least one non-LOS signal 120. The LOS signal 115 has an AoA value of $\Theta 1$ while the non-LOS signal has an AoA value of $\Theta 2$.

The AP 105 also includes a processor 210 which represents any number of processing elements that each can include any number of processing cores and memory 215 which can include volatile memory, non-volatile memory, and combinations thereof. The memory 215 includes an AoA resolver 220 which can be software, firmware, hardware, or combinations thereof that performs AoA resolving. In this example, the AoA resolver 220 generates a measured phase vector 225 from the LOS signal 115 and the non-LOS signal 120. That is, the measured phase vector 225 is a combination of these signals 115, 120 and can be expressed by the equation: $a(\Theta 1)+a(\Theta 2)$.

Generally, AoA resolving involves identifying AoA values corresponding to the various LOS and non-LOS signal paths of a multipath signal transmitted by a single client device. That is, the measured phase vector 225 is a combination of the AoA values of the signals 115, 120 but through AoA resolving, the AoA resolver 220 can identify (or estimate) the individual AoA values of the paths corresponding to the LOS signal 115 and the non-LOS signal 120. In one embodiment, the AoA resolver 220 uses candidate AoAs 230 and a utility function to identify the actual AoA values of the signals 115, 120. While the embodiments herein are not limited to any particular AoA resolving technique, the details of at least one suitable AoA resolving technique are described in FIG. 4.

Once the AoA resolver 220 identifies the AoAs of the LOS and non-LOS signals 115, 120 in the multipath signal, these AoA values (i.e., $\Theta 1$ and $\Theta 2$) can be sent to the WLAN controller or a master AP (along with the AoA values identified by the other APs in the wireless network) to perform AP voting to identify the location of the client device.

Figure 3:
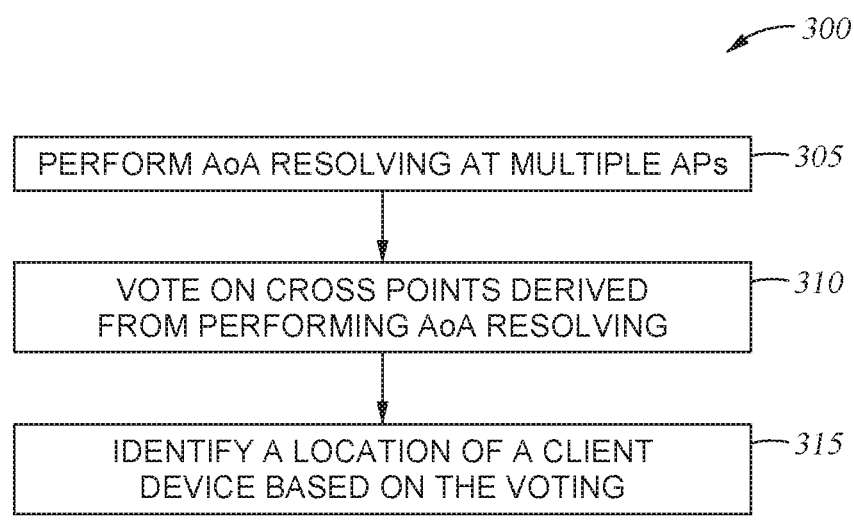
FIG. 3 is a flowchart for identifying a location of a client device using AP voting, according to one embodiment.

FIG. 3 is a flowchart of a method 300 for identifying a location of a client device using AP voting, according to one embodiment. At block 305, each AP in a wireless network performs AoA resolving to identify AoAs corresponding to a multipath signal transmitted by the same client device. For example, block 305 may be performed using special location packets that are transmitted by the client device. Further, the client device may transmit the wireless signal used to perform AoA resolving when other client devices in the wireless network are not transmitting wireless signals to improve signal quality, but this is not a requirement.

Figure 4:
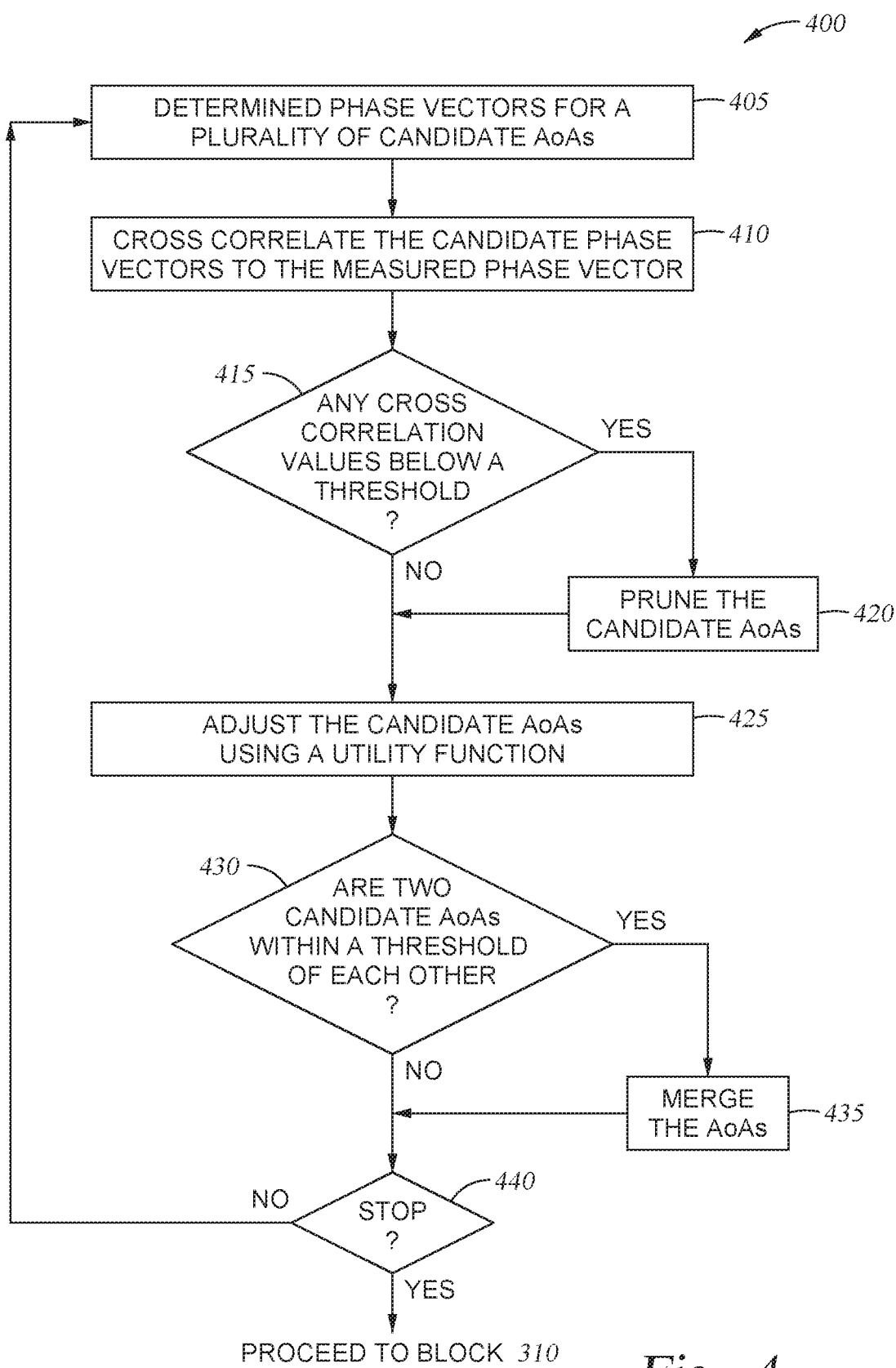
FIG. 4 is a flowchart for performing AoA resolving, according to one embodiment.

While FIG. 4 illustrates one embodiment for performing AoA resolving, the method 300 is not limited to any particular technique. That is, the method 300 can be used with any AoA resolving technique that can identify individual AoAs corresponding to paths in a multipath signal.

At block 310, the voting module uses the AoAs identified at block 305 to vote on cross points derived from paths generated using the AoAs. That is, the voting module can identify locations where two paths derived using AoAs from at least two different APs intersect. These locations are referred to herein as cross points. However, since the AoAs can correspond to non-LOS paths, the cross points derived using non-LOS paths are not the actual location of the client device and are referred to as ghost targets. The voting module can determine whether paths derived from AoAs of other APs also intersect the cross points (referred to as "voting") to increase a score of the cross points. That is, because multipath signals are heavily dependent on specific geographic locations, it is unlikely that multiple APs receive non-LOS signals that have AoAs that all correspond to the same cross point. Thus, the cross point with the highest score most likely is the actual location of the client device. The details of performing AP voting are described in more detail in FIG. 4.

At block 315, the voting module identifies a location of the client device based on the voting. In one embodiment, the voting module determines the cross point with the highest score is the location of the client device. However, there may be a tie where multiple cross points have the same score. Or, to improve accuracy, the voting module may perform further calculations using multiple cross points (e.g., the cross points with the three highest scores). For example, the voting module can generate heat maps at the locations of the cross points, but since these heat maps are limited to the immediate vicinity around the cross points, the number of complex calculations is vastly reduced relative to generating a heat map with a grid that includes the entire wireless network.

FIG. 4 is a flowchart of a method 400 for performing AoA resolving, according to one embodiment. In one embodiment, the method 400 is performed at each AP to identify individual AoAs corresponding to a multipath signal. However, in another embodiment, the APs may transmit their measured data to a master AP or WLAN controller that performs AoA resolving for the APs. In either case, the method 400 is just one example of performing AoA resolving on a multipath signal.

At block 405, the AP determines phase vectors for a plurality of candidate AoAs (also referred to as estimated AoA values). In one embodiment, the AoAs are predetermined values that represent an initial guess or estimate of the actual AoAs in the multipath signal. For example, the candidate AoAs may be equally distributed around the field of view of the AP such as 0, 90, 180, and 270 degrees. Further, the AP can use any number of initial candidate AoAs—e.g., 4, 8, 15, etc. The initial number and values of the candidate AoAs may be set by a user administrator. In another example, the AP may adjust the number or values of the candidate AoAs in response to its environment. For example, the AP may learn after performing method 400 for multiple different multipath signals that the environment generates less non-LOS paths than initially believed, and reduce the number of initial candidate AoAs.

The AP determines phase vectors for each of the candidate AoAs. For example, if the candidate AoAs includes four different AoAs with four different values, the AP generates four different candidate phase vectors based on the received multipath signal.

At block 410, the AP cross correlates the candidate phase vectors to the measured phase vector. Using FIG. 2 as an example, the measured phase vector 225 is the actual phase vector of the multipath signal which has an AoA based on a combination of the AoA Θ2 of the LOS signal 115 and the AoA Θ1 of the non-LOS signal 120. The candidate phase vectors, in contrast, are based on a single AoA. Thus, the closer the AoA of a candidate phase vector is to one of the AoAs Θ1 or Θ2 of the measured phase vector, the higher the cross correlation values. That is, determining the cross correlation informs the AP how close the AoAs used to generate the candidate phase vectors are to the actual AoAs corresponding to the measured phase vector. For example, assuming the actual values of AoAs Θ1 or Θ2 are 40 and 150 degrees, respectively, a candidate phase vector derived from an AoA value of 180 degrees has a higher cross correlation than a candidate phase vector derived from an AoA value of 270 degrees.

Further, the respective strengths or RSSI of the LOS and non-LOS signals can affect the cross correlation values. For example, two candidate AoAs may be the same number of degrees away from the LOS signal 115 and the non-LOS signal 120 illustrated in FIG. 2 (e.g., five degrees). But if the LOS signal 115 has a higher RSSI than the non-LOS signal 120, the candidate AoA that is five degrees from the AoA of the LOS signal 115 may have a higher cross correlation value with the measured phase vector than the candidate AoA that is five degrees from the AoA of the non-LOS signal 120. That is, the correlation value can be highly dependent on the signal path strength (indicated by the RSSI value). The signal path dynamic range could be as large as 20 dB for indoor environment.

At block 415, the AP determines whether any cross correlation value determined at block 410 are below a threshold. That is, the method 400 can use a minimum threshold to eliminate candidate AoAs that are too far from any of the AoAs of the multipath signal. If at least one candidate AoA has a candidate phase vector that is not sufficiently correlated to the measured phase vector, the method 400 proceeds to block 420 where the AP prunes the candidate AoAs from consideration.

At block 425, the AP adjusts the candidate AoAs using a utility function. In one embodiment, the utility function includes a mathematical model built using a probability density function (PDF) that identifies the likelihood the client device is at the candidate AoA. The error of the utility function can be modeled as a constant distribution where the client location is an unknown value. The utility function can be used to evaluate all of the candidate phase vector to yield an error of the candidate AoAs.

Using a Newton search method, the AP can perform a search over the utility function to identify a better guess of the candidate AoAs. Stated differently, the AP determines an adjustment for each of the candidate AoAs. In one embodiment, the utility function performs the search by calculating the derivative to find a direction where the value of the utility function increases according to the angle. The AP then adjusts the candidate AoA in that direction (e.g., by increasing or decreasing the value of the candidate AoA). In one embodiment, the processing performed at blocks 405-425 relies only on the array geometry and the measured phase vectors, and thus, can be performed independently at each AP.

At block 430, the AP determines whether two candidate AoAs are within a threshold of each other. While the candidate AoAs may start out with equal distant spacing (or with greater spacing), as the method 400 repeats block 425, some of the candidate AoAs may begin to converge on the same AoA in the multipath signal. For example, the multipath signal may include two LOS and non-LOS signal paths as shown in FIG. 2, but after several iterations the method 400 may have three candidate AoAs where one of the AoAs converges on the AoA of the non-LOS signal path but the other two of the AoAs converge on the AoA of the LOS signal path.

If these two candidate AoAs become sufficiently close to each other (e.g., within a threshold number of degrees), at block 435 the AP can merge them into a single candidate AoA. For example, the AP may simply choose one of the candidate AoAs or average the two AoAs to generate a new candidate AoA. In this manner, the method 400 repeats and the candidate AoAs converge on the actual AoAs of the signal paths corresponding to the measured phase vector, preferably the number of candidate AoAs matches the number of signal paths (both LOS and non-LOS) in the multipath signal.

At block 440, the AP determines whether to repeat the method 400 or to stop. In one embodiment, the current AoA results are compared to the AoA results obtained from the previous iteration. If the differences for the AoAs are small enough, the AP stops the iteration. In another embodiment, the AP may use the error values of the utility function generated at block 425 to determine when to stop the method 400 since the utility function is also a good indicator for the accuracy of the AoA guess. If the output value for the utility function did not change (or with very small change) for a couple iterations, the AP can safely stop the iteration and the method 400 stops. If not, the method 400 repeats by returning to block 405 where new phase vectors are determined for the adjusted candidate AoA (which were determined at block 425). In this manner, the method 400 can continue to adjust the candidate AoA so that at least one AoA converges on the signal paths forming the multipath signal transmitted by the client device.

Once the AP determines to stop performing AoA resolving at block 440, the method 400 can proceed to block 310 where the voting module collects the candidate AoAs generated by each AP and can perform AP voting.

Figure 5:
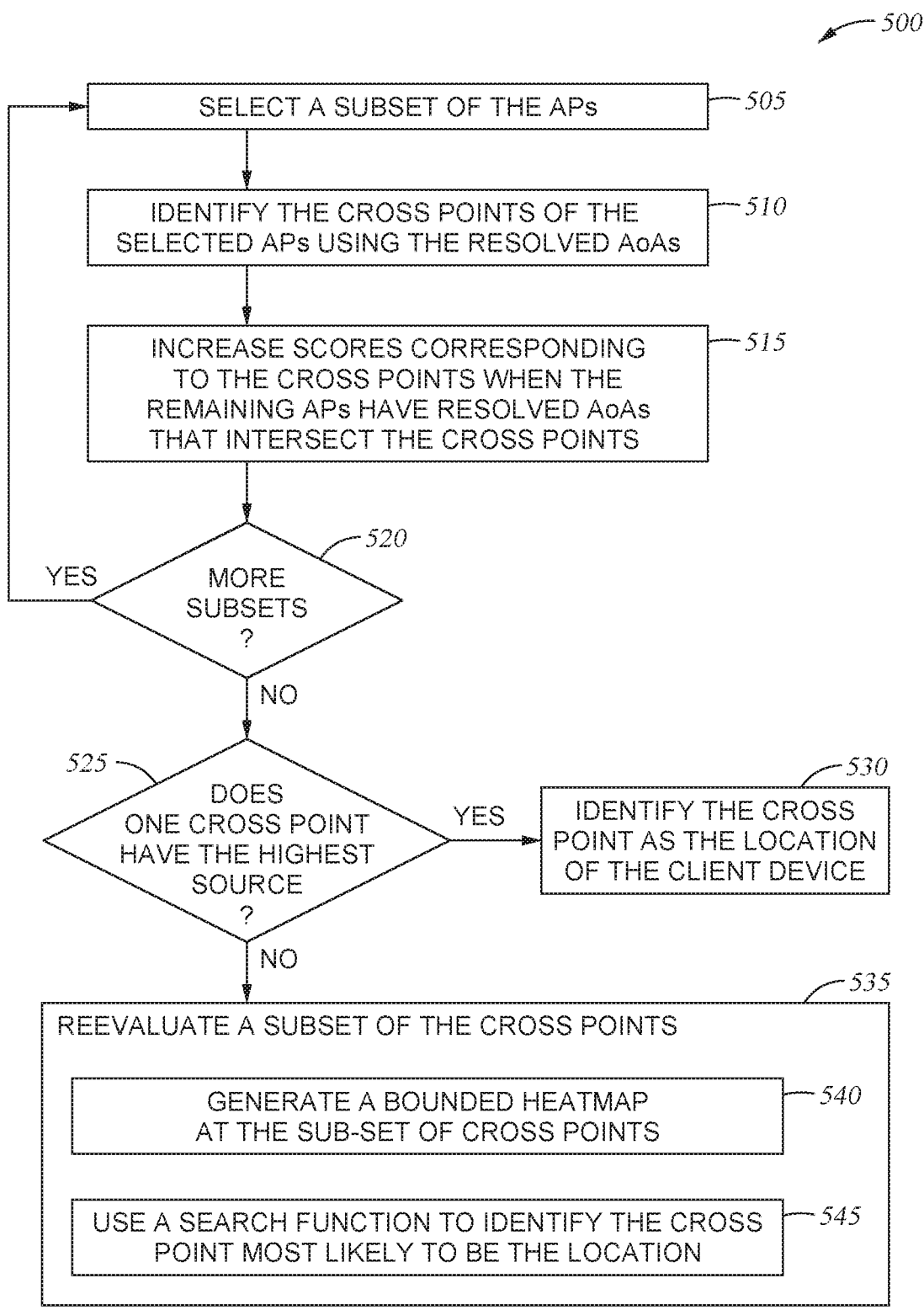
FIG. 5 is a flowchart for performing AP voting, according to one embodiment.

FIG. 5 is a flowchart of a method 500 for performing AP voting, according to one embodiment. In one embodiment, the method 500 is one embodiment for performing the AP voting at block 310 of the method 300. Method 500 assumes that the voting module has already received the candidate AoAs identified by the APs when performing AoA resolving.

At block 505, the voting module selects a subset of the APs in the network. For example, the voting module may select two, three, four, etc. of the APs. For ease of explanation, the method 500 assumes the size of the subset is two.

At block 510, the voting module identifies the cross points of the selected APs using the resolved AoAs. That is, the voting module uses the AoAs of the selected APs to derive paths extending from the selected APs. These paths represent the LOS and non-LOS signals paths identified by the APs. Depending on the AoAs and the geographic location of the selected APs, some of these paths may intersect. These intersections are cross points and represent potential locations of the client device that transmitted the multipath signal. However, as mentioned above, the voting module does not yet know whether the paths are LOS paths or non-LOS paths, and thus, does not know if a cross point is the actual location of the client device (e.g., corresponds to the LOS paths of the selected APs) or is a ghost target that is on a non-LOS path. One example of such a scenario is illustrated in FIG. 6A.

Figure 6A:
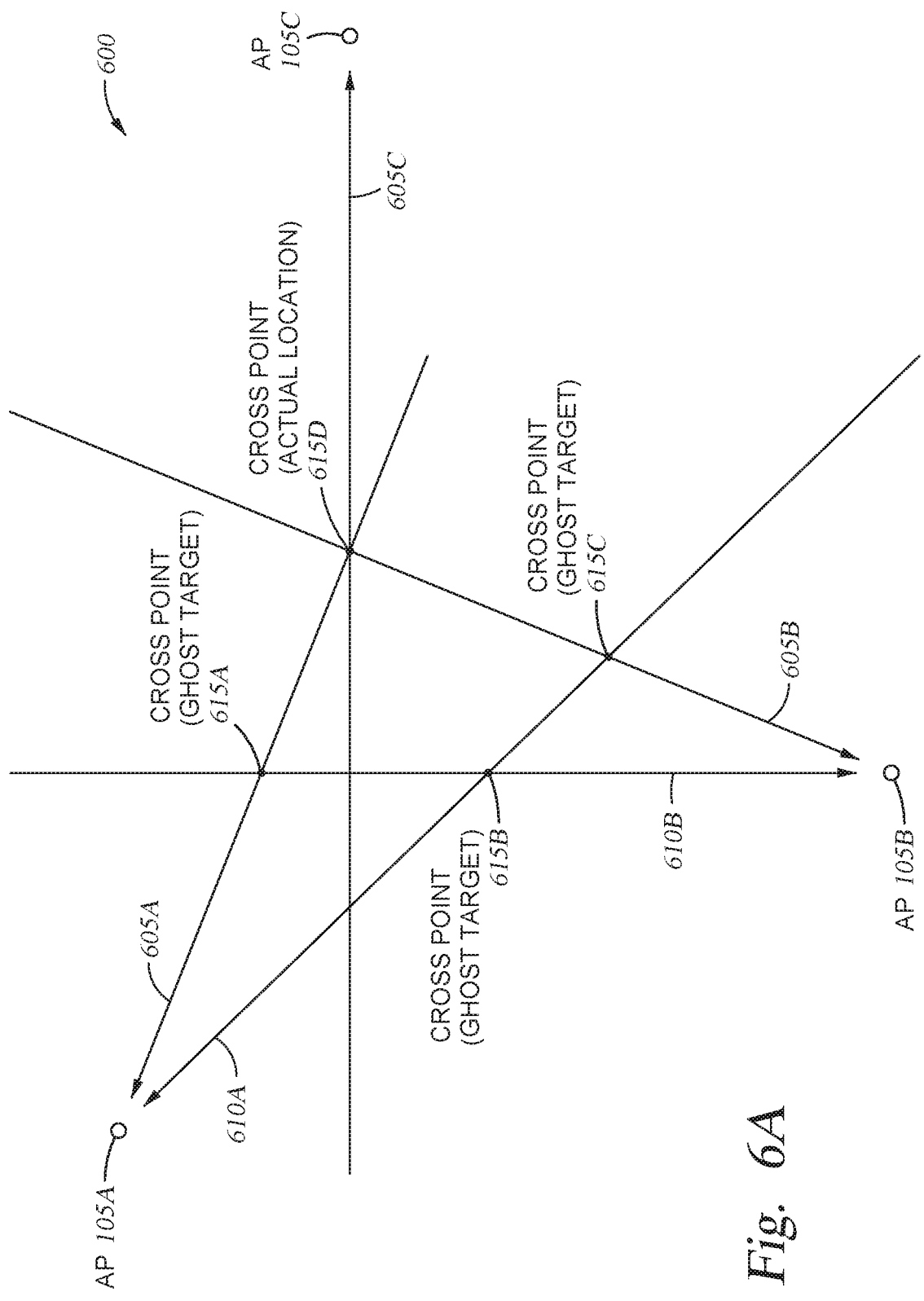
FIGS. 6A and 6B illustrate identifying cross points using AoAs, according to one embodiment.

FIG. 6A illustrates identifying cross points using AoAs, according to one embodiment. FIG. 6A illustrates an overhead view of the three APs 105A-C in their respective physical locations in an environment 600. In FIG. 6A, it is assumed that AP 105A and 105B are the subset of APs that were selected at block 505. As shown, when performing AoA resolving, the AP 105A identified a first candidate AoA that defines a LOS path 605A and a second candidate AoA that defines a non-LOS path 610A. When performing AoA resolving at the AP 105B, it identified a first candidate AoA that defines a LOS path 605B and a second candidate AoA that defines a non-LOS path 610B. However, as mentioned above, the voting module does not yet know which of the paths 605 and 610 are LOS paths and non-LOS paths.

The voting module determines where the paths 605A and 610A of the AP 105A intersect with the paths 605B and 610B of the AP 105B. In this example, the paths intersect at four cross points 615A-D. The cross points 615A-C correspond to ghost targets since at least one of the paths forming the cross points 615A-C is a non-LOS path. However, for the cross point 615D, both of the paths intersecting at this location are LOS paths (i.e., LOS paths 605A and 605B). In this manner, the voting module can select the AoAs for a subset of the APs in the wireless network and determine, using paths derived from the APs, the number of potential locations (or cross points 615) where the client device may be located.

Returning to the method 500, at block 515 the voting module increases scores corresponding to the cross points when the remaining APs have resolved AoAs that intersect the cross points. That is, using the cross points identified at block 510 for the subset of APs, the voting module uses the AoAs of the other APs in the wireless network to derive paths and determine whether those paths intersect the cross points. In this manner, the other APs can "vote" on the cross points identified at block 510 to determine whether those APs have identified the cross point as a potential location of the client device.

Returning to FIG. 6A, it illustrates using the AoA from another AP (i.e., the AP 105C) to vote on the cross points corresponding to the AoAs of the APs 105A and 105C. As shown, the AP 105C has at least one AoA that corresponds to a LOS path 605C that intersects with one of the previously determined cross points 615—i.e., the cross point 615D. In response, the voting module increases a score corresponding to the cross point 615D indicating it has received a vote from the AP 105C.

Note that the path 605C also intersects other paths corresponding to the AoAs of the APs 105A and 105B (i.e., the non-LOS path 610B and the non-LOS path 610A) but because these intersection are not cross points, they are not considered. Put differently, because the paths of the APs 105A and 105B also do not intersect at these points, these intersections with the path 605C of the AP 105C are ignored.

Further, although not shown, the AP 105C may have identified other resolved AoAs that form other paths (e.g., non-LOS paths). But since those paths do not intersect with any of the cross points 615A-D in FIG. 6A, they can be ignored. That is, like the path 605C, these non-LOS paths may intersect at different locations with the paths corresponding to the APs 105A and 105B, but because these locations are not cross points for the subset of selected APs, they can be ignored.

While FIG. 6A includes only three APs, if there were four APs, the paths derived from the AoAs of the fourth AP would also be considered by the voting module. That is, the voting module would plot the paths of the fourth AP to determine whether they intersect with one of the cross points 615A-D and update their scores accordingly. Ideally, the fourth AP would have at least one path (i.e., a LOS path) that also intersects at the cross point 615D. But due to chance, the fourth AP may have a non-LOS path that intersects with one of the cross points 615A-C that corresponds to a ghost target, which would increase their scores.

Figure 6B:
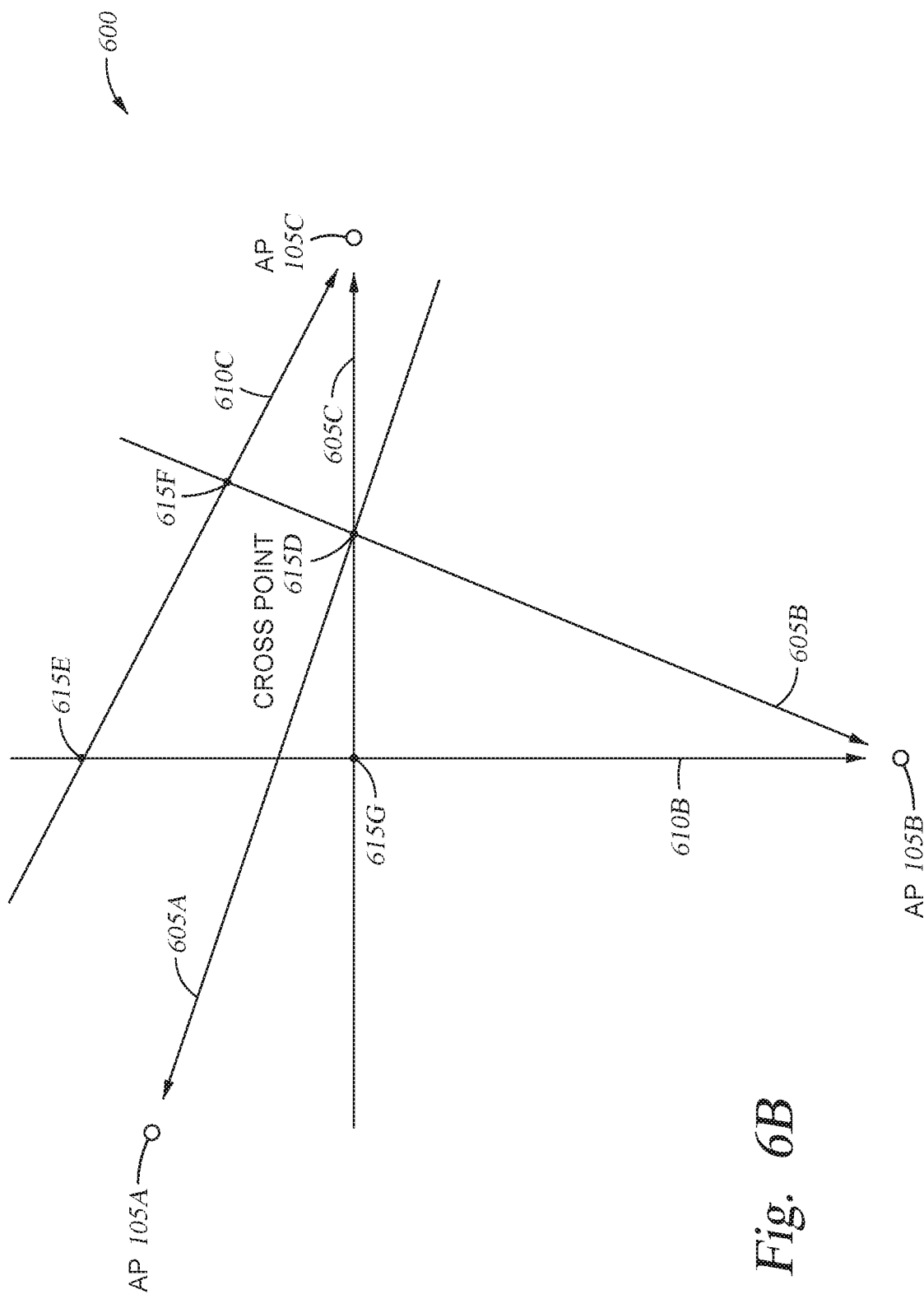

Returning to the method 500, at block 520 the voting module determines whether there are additional subsets to consider. For example, the voting module may choose a different subset of APs to repeat blocks 505-515 until all the combinations of APs have been exhausted. FIG. 6B illustrates repeating the blocks 505-515 where instead of APs 105A and 105B being the selected APs, the APs 105B and 105C are the selected subset of APs.

In FIG. 6B, the AoAs resolved at the AP 105B are used to derive the same non-LOS path 610B and LOS path 605B as shown in FIG. 6A. The AoAs resolved at the AP 105C are used to derive the LOS path 605C (which was also shown in FIG. 6A) and a new non-LOS path 610C. When the method 500 repeats, at block 510 the voting module identifies the cross points of these paths—i.e., cross points 615D-G. Thus, except for the cross point 615D, the cross points 615E-G are at different locations than the cross points 615A-C in FIG. 6A. The cross points 615E-G correspond to ghost targets while the cross point 615D is the actual location of the client device.

When repeating block 515, the AoAs of the AP not in the subset (i.e., the AP 105A) are used to derive paths to determine whether those paths intersect one of the cross points 615D-G. In this case, only the LOS path 605A of the AP 105A intersects one of the cross point 615D-G—i.e., 615D—and thus, the other paths corresponding to the AP 105A (e.g., its non-LOS paths) are not illustrated in FIG. 6B. Because the path 605A intersects the cross point 615D, the voting module increases the score of this cross point 615 to indicate the AP 105A is voting for this cross point.

In this manner, the voting module can select different subsets of the APs and use the remaining APs to vote on the cross points. While FIGS. 6A and 6B illustrate that AP 105B is paired twice—once with AP 105A and again with AP 105C—in another embodiment, an AP may be put in a subset once. For example, if the wireless network has four APs, the method 500 may select the first and second APs at block 505 and then select the third and fourth APs again at block 505 after the method 500 repeats.

At block 525, the voting module determines whether one of the cross points has the highest score. If so, the method 500 proceeds to block 530 to identify that cross point as the location of the client device. Using the example illustrated in FIGS. 6A and 6B, the location of the cross point 615D is deemed as the location of the client device.

However, multiple cross points may tie with the highest score. Or in another embodiment, for improved accuracy, the voting module may want to further evaluate the cross points with the top three or four highest scores (even if the scores are not tied). For example, the voting module may want to further evaluate cross points with the top 5% of scores or any cross points that have scores that are within 5% of the cross point with the highest score. In these examples, the method 500 proceeds to block 535 where the voting module reevaluates a subset of the cross points.

Block 535 illustrates two alternative options for reevaluating a subset of the cross points (e.g., the cross points with the highest scores). At block 540, the voting module generates a bounded heat map at the locations of the subset of cross points. That is, the voting module can generate a bounded heat map for the local region of each candidate client location corresponding to the subset of cross points and then pick the grid point with the largest correlation value. Thus, the heat maps are limited to the locations of the subset of cross points rather than searching a grid that includes the entire footprint of the wireless network. That is, the voting module can generate a heat map for each AP through correlating the measured AoA phase vector with the ideal AoA phase vectors for the grid points at the subset of cross points.

At block 545, the voting module can use a search function to identify the cross point most likely to be the location of the client device. For example, the voting module can search for the optimal solution using a Newton search method.

Regardless of whether the technique in block 540 or 545 is used, the voting module can further process the subset of cross points identified doing AP voting. Doing so may improve the accuracy of the location system.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
performing angle of arrival (AoA) resolving at a plurality of access points (APs), wherein each of the plurality of APs generate multiple AoA values, wherein the multiple AoA values represent directions of a multipath signal generated by a client device;
identifying cross points using the multiple AoA values from the plurality of APs, wherein each cross point identifies a candidate location of the client device; and
determining scores for each of the cross points based on how many of the plurality of APs have AoA values corresponding to the cross points.

2. The method of claim 1, further comprising:
identifying one of the cross points as a location of the client device based on the scores.

3. The method of claim 1, wherein identifying the cross points using the multiple AoA values comprises:
identifying a first cross point of the cross points using the multiple AoA values for a subset of the plurality of APs.

4. The method of claim 3, wherein determining the scores for each of the cross points, comprises:
iterating through a remaining plurality of APs not in the subset of the plurality of APs to determine whether their multiple AoA values correspond to the first cross point; and
incrementing a score of the first cross point when one of the remaining plurality of APs has at least one AoA value corresponding to the first cross point.

5. The method of claim 4, wherein identifying the cross points using the multiple AoA values comprises:
selecting a subset of the remaining plurality of APs;
identifying a second cross point of the cross points using the multiple AoA values for the subset of the remaining plurality of APs;
wherein determining the scores for each of the cross points, comprises:
iterating through the plurality of APs not in the subset of the remaining plurality of APs to determine whether their multiple AoA values correspond to the second cross point; and
incrementing a score of the second cross point when one of the plurality of APs not in the subset of the remaining plurality of APs has at least one AoA value corresponding to the second cross point.

6. The method of claim 1, further comprising:
identifying multiple cross points of the cross points by comparing the scores to a threshold;
generating heat maps at locations corresponding to the multiple cross points; and
selecting one of the multiple cross points as an actual location of the client device based on identifying a grid point with a largest correlation value from the heat maps.

7. The method of claim 1, wherein performing AoA resolving at the plurality of APs comprises, at each of the plurality of APs:
measuring a first phase vector for the multipath signal received from the client device;
measuring a first plurality of phase vectors based on a set of estimated AoA values;
correlating the first plurality of phase vectors with the first phase vector to generate first correlation values;
eliminating at least one of the set of estimated AoA values using the first correlation values;
adjusting the values of the estimated AoA values based on a utilization function;
measuring a second plurality of phase vectors based on the adjusted values of the estimated AoA values;
correlating the second plurality of phase vectors with the first phase vector to generate second correlation values; and upon determining that the set of estimated AoA values satisfies an accuracy threshold, setting the estimated AoA values as the multiple AoA values representing the directions of the multipath signal.

8. A non-transitory computer readable medium having program instructions embodied therewith, the program instructions executable by a processor to perform an operation, the operation comprising:
performing angle of arrival (AoA) resolving at a plurality of access points (APs), wherein each of the plurality of APs generate multiple AoA values, wherein the multiple AoA values represent directions of a multipath signal generated by a client device;
identifying cross points using the multiple AoA values from the plurality of APs, wherein each cross point identifies a candidate location of the client device; and
determining scores for each of the cross points based on how many of the plurality of APs have AoA values corresponding to the cross points.

9. The non-transitory computer readable medium of claim 8, wherein the operation further comprises:
identifying one of the cross points as a location of the client device based on the scores.

10. The non-transitory computer readable medium of claim 8, wherein identifying the cross points using the multiple AoA values comprises:
identifying a first cross point of the cross points using the multiple AoA values for a subset of the plurality of APs.

11. The non-transitory computer readable medium of claim 10, wherein determining the scores for each of the cross points, comprises:
iterating through a remaining plurality of APs not in the subset of the plurality of APs to determine whether their multiple AoA values correspond to the first cross point; and
incrementing a score of the first cross point when one of the remaining plurality of APs has at least one AoA value corresponding to the first cross point.

12. The non-transitory computer readable medium of claim 11, wherein identifying the cross points using the multiple AoA values comprises:
selecting a subset of the remaining plurality of APs;
identifying a second cross point of the cross points using the multiple AoA values for the subset of the remaining plurality of APs;
wherein determining the scores for each of the cross points, comprises:
iterating through the plurality of APs not in the subset of the remaining plurality of APs to determine whether their multiple AoA values correspond to the second cross point; and
incrementing a score of the second cross point when one of the plurality of APs not in the subset of the remaining plurality of APs has at least one AoA value corresponding to the second cross point.

13. The non-transitory computer readable medium of claim 8, wherein the operation further comprises:
identifying multiple cross points of the cross points by comparing the scores to a threshold;
generating heat maps at locations corresponding to the multiple cross points; and
selecting one of the multiple cross points as an actual location of the client device based on identifying a grid point with a largest correlation value from the heat maps.

14. The non-transitory computer readable medium of claim 8, wherein performing AoA resolving at the plurality of APs comprises, at each of the plurality of APs:
measuring a first phase vector for the multipath signal received from the client device;
measuring a first plurality of phase vectors based on a set of estimated AoA values;
correlating the first plurality of phase vectors with the first phase vector to generate first correlation values;
eliminating at least one of the set of estimated AoA values using the first correlation values;
adjusting the values of the estimated AoA values based on a utilization function;
measuring a second plurality of phase vectors based on the adjusted values of the estimated AoA values;
correlating the second plurality of phase vectors with the first phase vector to generate second correlation values; and
upon determining that the set of estimated AoA values satisfies an accuracy threshold, setting the estimated AoA values as the multiple AoA values representing the directions of the multipath signal.

15. A computing system, comprising:
a processor; and
memory storing a program executable by the processor to perform an operation, the operation comprising:
receiving multiple AoA values from a plurality of APs, wherein the multiple AoA values represent directions of a multipath signal generated by a client device;
identifying cross points using the multiple AoA values from the plurality of APs, wherein each cross point identifies a candidate location of the client device; and
determining scores for each of the cross points based on how many of the plurality of APs have AoA values corresponding to the cross points.

16. The computing system of claim 15, wherein the operation comprises:
identifying one of the cross points as a location of the client device based on the scores.

17. The computing system of claim 15, wherein identifying the cross points using the multiple AoA values comprises:
identifying a first cross point of the cross points using the multiple AoA values for a subset of the plurality of APs.

18. The computing system of claim 17, wherein determining the scores for each of the cross points, comprises:
iterating through a remaining plurality of APs not in the subset of the plurality of APs to determine whether their multiple AoA values correspond to the first cross point; and
incrementing a score of the first cross point when one of the remaining plurality of APs has at least one AoA value corresponding to the first cross point.

19. The computing system of claim 18, wherein identifying the cross points using the multiple AoA values comprises:
selecting a subset of the remaining plurality of APs;
identifying a second cross point of the cross points using the multiple AoA values for the subset of the remaining plurality of APs;
wherein determining the scores for each of the cross points, comprises:
iterating through the plurality of APs not in the subset of the remaining plurality of APs to determine whether their multiple AoA values correspond to the second cross point; and incrementing a score of the second cross point when one of the plurality of APs not in the subset of the remaining plurality of APs has at least one AoA value corresponding to the second cross point.

20. The computing system of claim 15, wherein the operation further comprises:
identifying multiple cross points of the cross points by comparing the scores to a threshold;
generating heat maps at locations corresponding to the multiple cross points; and
selecting one of the multiple cross points as an actual location of the client device based on identifying a grid point with a largest correlation value from the heat maps.

* * * * *